United States Patent Office 3,490,208
Patented Jan. 20, 1970

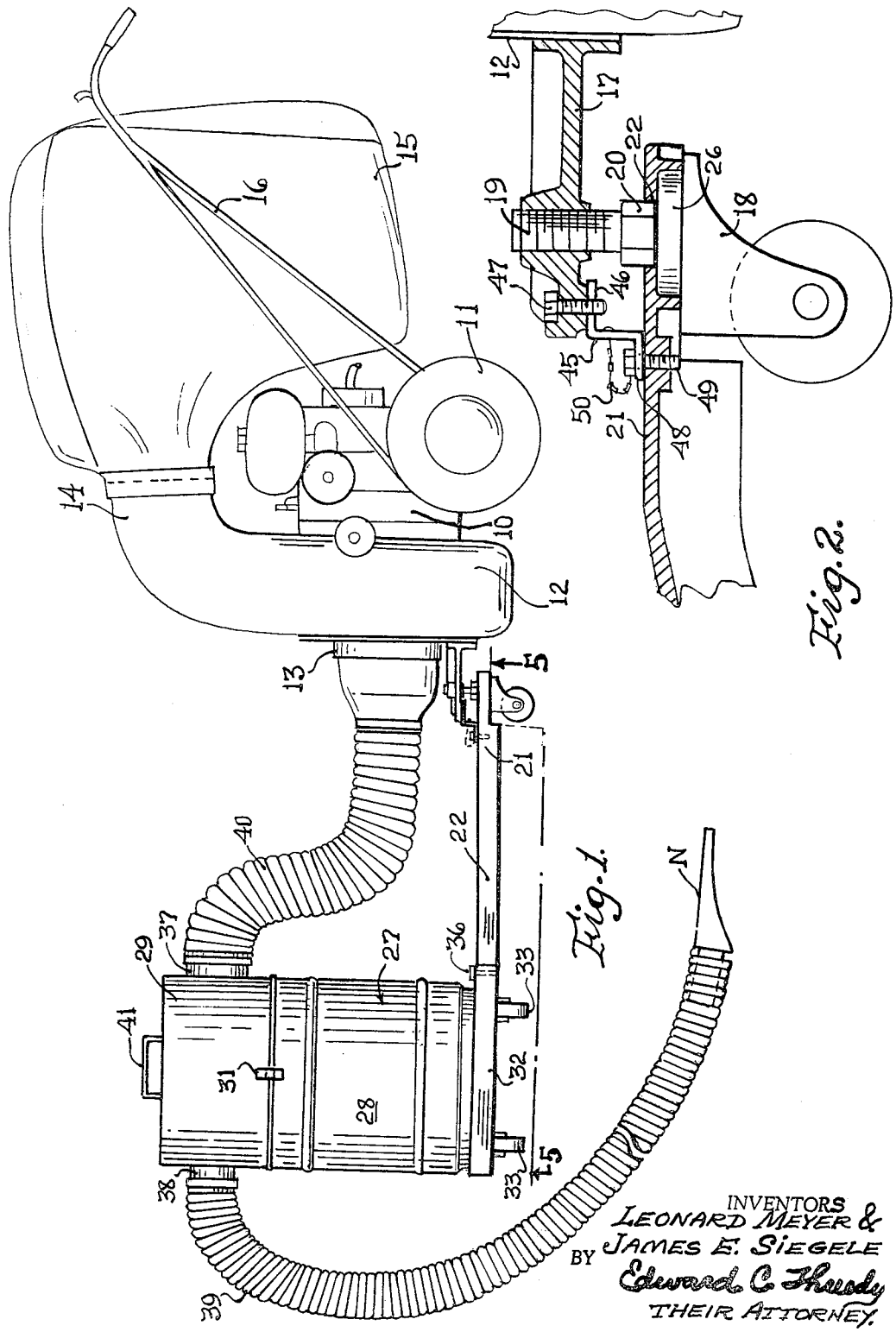

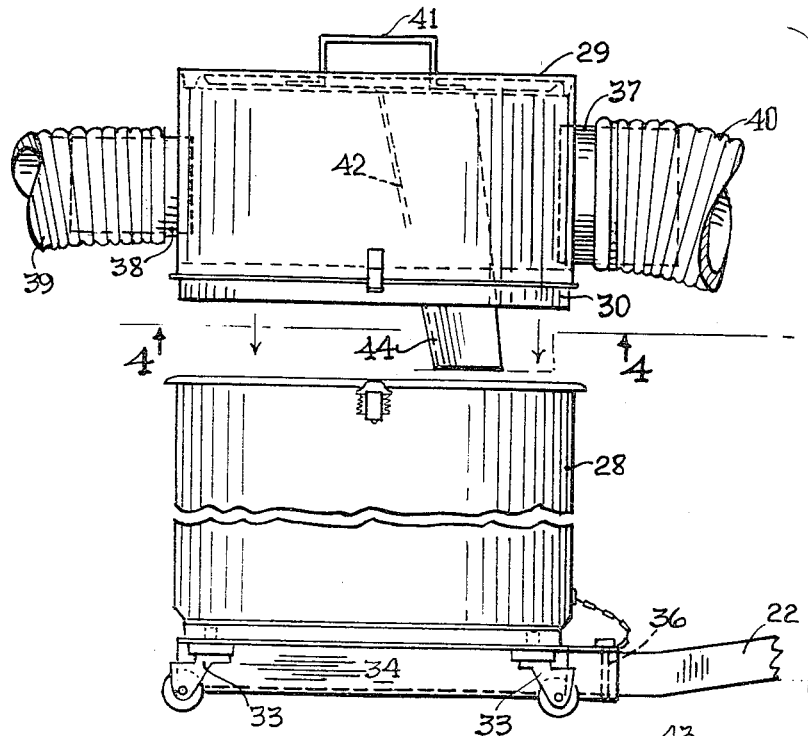
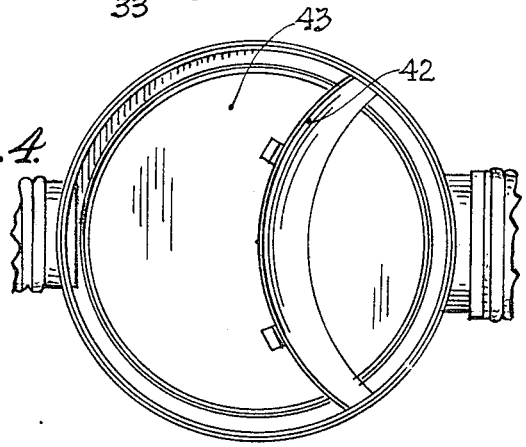
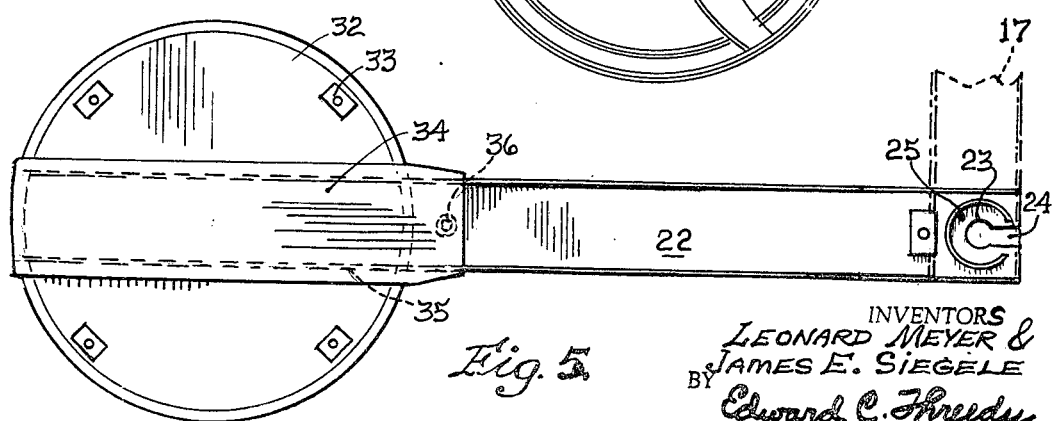

3,490,208
INDUSTRIAL HEAVY-DUTY VACUUM CLEANER
Leonard Meyer and James E. Siegele, both of 2210
Skokie Valley Road, Highland Park, Ill. 60035
Filed Aug. 25, 1966, Ser. No. 575,036
Int. Cl. B01d 45/08
U.S. Cl. 55—356                                2 Claims

ABSTRACT OF THE DISCLOSURE

An industrial heavy-duty portable vacuum cleaner having a collector tank related to a vacuum or suction motor in a manner such that the debris is intercepted in the tank by a baffle which deflects the debris toward the bottom of the collector tank and prevents the same from traveling to the motor, to prevent clogging or damaging of the impeller.

An object of our invention is to provide such an apparatus which is portable and which includes a collector tank so related with respect to the vacuum or suction motor that the debris is intercepted in the tank by a baffle which deflects the debris toward the bottom of the collector tank and prevents the same from traveling to the motor, thus to protect the impeller from clogging or being damaged.

A further object of our invention is to provide a simple and inexpensive arrangement for detachably connecting the collector tank to the mobile vacuum or suction motor and for holding the collector tank against movement laterally with respect to the mobile vacuum motor when the apparatus is being transported from place to place.

A further and equally important object is to provide an apparatus of the character hereinafter described, which will be economical in manufacture and highly efficient in use.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a side elevational view of the invention;

FIG. 2 is a fragmentary sectional detail view of the connection between the draw bar and motor casing shown in FIG. 1;

FIG. 3 is a side elevational view of the collector tank showing the cover thereof in exploded relation with respect to the bottom portion of the tank;

FIG. 4 is a bottom plan view taken substantially on line 4—4 of FIG. 3;

FIG. 5 is a bottom plan view taken substantially on line 5—5 of FIG. 1.

The several objects of our invention may be accomplished by the preferred form of construction shown in the accompanying drawings, wherein a vacuum motor assembly is indicated at 10 and includes a motor supported by a wheel-bearing chassis 11 including a suction casing 12 having an inlet 13 and an outlet 14. Connected to the outlet 14 is a bag 15 which may be formed of cloth or any suitable synthetic material. For easy manipulation, suitable handles 16 are provided. The casing 12 has attached thereto a bracket 17 which carries a roller caster assembly 18. This caster assembly 18 by a threaded stud shaft 19 is connected to and carried beneath the bracket 17 as seen in FIG. 2. The caster assembly 18 includes a nut 20 threaded upon the stud shaft 19 with the nut normally disposed in spaced relation to the bracket 17, as shown.

In order to assemble one end 21 of a draw bar 22 to the bracket 17 and caster assembly 18, there is provided in the end 21 of the draw bar 22 an enlarged opening 23 of a size equal to the diameter of the nut 20, and an open slot 24 of a lesser size which has communication with the enlarged opening 23, as shown in FIG. 5. The exposed portion of the stud shaft 19 will pass freely through the slot 24 when the end 21 of the draw bar 22 is moved beneath the bracket 17 and, when the opening 23 is in alignment with the nut 20, the draw bar 22 may be moved longitudinally of the stud shaft 19 away from the bracket 17 so as to place the nut 20 in a captured position within the enlarged opening 23. At the same time the enlargement 26, which forms an integral part of the caster assembly 18 will be confined within a recess 25 defined by a partial circular abutment carried by the underside of the draw bar 22 adjacent the end 21 thereof, as seen in FIGS. 2 and 5. The confinement of the nut 20 in the enlarged opening 23 provides a swivel connection between the bracket 17 and the draw bar 22.

A collector tank 27 in attached to the draw bar 22 and comprises a bottom section 28 and a cover 29 therefor. The cover 29 has a peripheral edge portion 30 which telescopes into the open end of the bottom section 28 of the tank 27. The cover 29 is removably connected to the bottom section 28 by any suitable means, such as indicated at 31, which means includes spring-held finger clips.

The tank 27 is mounted upon a mounting base 32 which has a plurality of casters 33 to permit convenient mobility of the tank 27. The base 32 provides a sleeve 34 fixedly secured to the base 32 in any suitable manner. The sleeve 34 removably receives the end portion 35 of the draw bar 22 and is removably connected thereto by a removable pin 36. The tank 27 provides an outlet ring 37 and an inlet ring 38 arranged diametrically with respect to each other as seen in FIG. 1. The ring 38 has secured thereto in any suitable manner one end portion of an inlet hose 39 which at its opposite end portion carries a nozzle of any suitable construction. Such nozzle N (see FIG. 1) constitutes no part of the present invention.

A hose 40 connects the outlet ring 37 with the inlet 13 of the casing 12. Each of the hoses 39 and 40 is formed of such material as will best serve the purpose and is flexible in construction to permit convenient moving of the apparatus over the area being cleaned.

The cover 29 is provided with a suitable handle 41 which facilitates removing the cover from the bottom portion 28 of the tank 27.

As seen in FIGS. 1 and 3, the hose 40 is of a larger diameter than the hose 39. By providing different diameters for the hoses 39 and 40, the suction intake through the hose 39 will be somewhat restricted, thereby creating a greater suction to pick up heavy as well as light debris.

In the cover 29 is arranged as seen in FIGS. 3 and 4, a baffle plate 42. This plate 42 is arcuate in plan view and extends in a diagonal plane from the top 43 of the cover 29, with its end portion 44 extending into the bottom section 28 of the tank 27. The baffle 42 is inclined downwardly away from the inlet ring 38, so that particles which are drawn through the hose 39 will strike the inclined surface of the baffle plate 42 and be deflected downwardly into the bottom portion of the tank 28, thus blocking debris from entering the casing 12 and damaging the impeller.

When in use, the mobility of the tank 27 permits the operator to move the same over the area being cleaned, this movement being permitted by the swivel action of the draw bar 22 relative to its connection with the bracket 17, the pin 49 being removed from connection with the end portion 21 of the draw bar 22. The hoses 39 and 40 being flexible, will not interfere with such mobility.

When the apparatus is being transported from one location to another, it is desirable that the tank 27 be held against movement. This is accomplished by removably restraining the draw bar 22 from swivel movement with respect to the bracket 17. To accomplish this, we provide a substantially Z-shaped arm 45 having one leg portion 46 thereof connected to the bracket 17 by a bolt 47. The other leg 48 of the arm by a pin 49 having chained connection as at 50 to the arm 45, is removably connected to the arm 45 and thus held substantially rigid during transport.

One of the features of our invention resides in the fact that the tank 27 is located between the nozzle N and the vacuum or suction motor. Such arrangement, as before stated, will intercept any particles or debris, preventing it from reaching the impeller, and thus avoiding damage.

We have found from experience that our improved cleaner will not only collect debris such as metal shavings, chips, filings, and the like, but will also pick up any water which may be on the floor of the area being cleaned. The cover 29 of the tank 27 may be easily and quickly removed and the bottom portion 28 of the tank disconnected from the draw bar 22 to permit emptying of the collected debris from the tank 27.

The efficiency of the intake hose 39 at the nozzle thereof is greatly enhanced by providing the intake hose 39 of a diameter less than that of the hose 40. By this arrangement, a substantial vacuum is built up in the tank 27 with the result that clogging is substantially eliminated through the line.

Having thus described our invention, what we claim as new and desire to protect by Letters Patent is:

1. In a portable, heavy-duty vacuum cleaner having a wheeled vacuum motor unit, including an intake opening and an exhaust outlet, the latter in open communication with a vacuum bag carried by the motor unit wherein the improvement comprises:
   (a) a collector tank removably connected to the vacuum motor unit and having a bottom section and a removable top cover therefor,
   (b) spring-held finger clips removably connecting said top cover to said bottom section of said collector tank,
   (c) said top cover for said tank providing an air intake and an air outlet, the latter connected by a hose to the intake opening of the vacuum motor unit, and a baffle disposed between said air intake and said outlet for deflecting debris collected by said collector tank,
   (d) a wheeled mounting base for said collector tank including a horizontally disposed sleeve,
   (e) a draw bar having one end insertable into said sleeve and connected thereto, and having its opposite end connected to the wheeled vacuum motor unit so as to connect said collector tank thereto,
   (f) a swivel connection between said draw bar and said wheeled vacuum motor unit comprising a bracket carried by the wheeled motor unit and a caster having a stud shaft with a nut thereon threadably connected to said bracket,
   (g) said draw bar having an open slot formed in said other end in open communication with an enlarged opening, with said slot being of a size to receive therein said stud shaft, and said enlarged opening being of a size to capture said nut after said stud shaft has passed through said slot and said draw bar is moved longitudinally thereon away from said bracket, and
   (h) means carried by said bracket for latching said draw bar in a fixed relation thereto when the portable vacuum cleaner is inoperative.

2. In a portable heavy-duty vacuum cleaner as defined by claim 1, wherein said means for latching said draw bar in a fixed relation to said bracket comprises a Z-shaped arm, one end of which is fixedly connected to said bracket and with its opposite end overlapping said opposite end of said draw bar and connected thereto in a fixed relation by a removable pin.

References Cited

UNITED STATES PATENTS

| | | | |
|---|---|---|---|
| 1,087,290 | 2/1914 | Harker | 55—446 X |
| 1,398,230 | 11/1921 | Hall | 55—429 |
| 1,559,456 | 10/1925 | Ranyard | 55—356 X |
| 1,868,519 | 7/1932 | Brever | 55—356 |
| 1,880,658 | 10/1932 | Baker | 55—473 X |
| 2,537,523 | 1/1951 | Frost | 55—473 X |
| 2,643,944 | 6/1953 | Malir. | |
| 2,698,564 | 1/1955 | Sawyer | 280—456 X |
| 2,712,945 | 7/1955 | Peterson | 280—474 X |
| 3,014,605 | 12/1961 | Heising | 280—474 X |
| 3,203,022 | 8/1965 | Clarke | 15—340 |
| 3,243,834 | 4/1966 | Trapp | 15—340 |
| 3,322,440 | 5/1967 | Breithaupt | 280—474 X |
| 1,014,027 | 1/1912 | Walter | 15—353 |
| 1,234,667 | 7/1917 | Howe et al. | |
| 1,534,233 | 4/1925 | Lundy | 15—340 |
| 1,899,394 | 2/1933 | Noelting et al. | |
| 2,347,524 | 4/1944 | Swen. | |
| 2,495,928 | 1/1950 | Geraldson | 280—504 X |
| 2,657,938 | 11/1953 | Browne et al. | 16—35 X |
| 2,772,889 | 12/1956 | Reynolds | 16—30 X |
| 2,867,231 | 1/1959 | Gerstmann. | |
| 2,899,700 | 8/1959 | Egan | 16—30 |
| 3,087,187 | 4/1963 | Hank et al. | 15—353 X |
| 3,204,285 | 9/1965 | Butsch | 16—40 |

FOREIGN PATENTS

| | | |
|---|---|---|
| 42,537 | 5/1933 | France. |
| 286,521 | 3/1928 | Great Britain. |
| 138,715 | 8/1960 | U.S.S.R. |

HARRY B. THORNTON, Primary Examiner

DENNIS E. TALBERT, JR., Assistant Examiner

U.S. Cl. X.R.

16—30; 15—340, 353; 55—315, 358, 361, 372, 429, 473, 439, 464; 280—474